United States Patent
Koo et al.

(10) Patent No.: US 10,744,884 B2
(45) Date of Patent: Aug. 18, 2020

(54) VEHICLE AND METHOD FOR CONTROLLING THE SAME

(71) Applicant: Hyundai Motor Company, Seoul (KR)

(72) Inventors: Jaho Koo, Seoul (KR); Young Suk Yoon, Seoul (KR); Jae Hoon Cho, Gyeonggi-do (KR); Donghyuk Oh, Seoul (KR); Yongchan Kim, Gyeonggi-do (KR); Boram Yang, Gyeonggi-do (KR); Sangjun Lee, Seoul (KR); Yeong Ju Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 348 days.

(21) Appl. No.: 15/333,617

(22) Filed: Oct. 25, 2016

(65) Prior Publication Data

US 2017/0282744 A1 Oct. 5, 2017

(30) Foreign Application Priority Data

Apr. 5, 2016 (KR) .................. 10-2016-0041445

(51) Int. Cl.
*B60L 11/18* (2006.01)
*G07C 5/08* (2006.01)
(Continued)

(52) U.S. Cl.
CPC .......... *B60L 11/1862* (2013.01); *B60K 35/00* (2013.01); *B60L 53/305* (2019.02);
(Continued)

(58) Field of Classification Search
CPC .............. B60L 11/1862; B60L 2230/16; B60L 2250/16; B60L 2260/52; B60L 2260/54;
(Continued)

(56) References Cited

U.S. PATENT DOCUMENTS 9,211,884 B2* 12/2015 Jang ..................... B60W 10/26
2013/0063283 A1* 3/2013 Kashima .................. B60L 3/12
340/988
(Continued)

FOREIGN PATENT DOCUMENTS

JP H 08240435 A 9/1996
JP 2009-171647 A 7/2009
(Continued)

OTHER PUBLICATIONS

JP-2012205470-A English translation (Year: 2012).*

*Primary Examiner* — Anne Marie Antonucci
(74) *Attorney, Agent, or Firm* — Mintz Levin Cohn Ferris Glovsky and Popeo, P.C.; Peter F. Corless

(57) ABSTRACT

A vehicle and a method for controlling the same are provided to secure additional distance to empty (DTE) of the vehicle by controlling the use of a load that is consuming battery power or by changing driving mode, when a recharging station is unavailable within DTE of the vehicle at a current battery charge level. The vehicle includes a DTE calculator that calculates DTE of the vehicle based on a battery charge level and a cluster that displays the calculated DTE. A controller detects a recharging station located within the calculated DTE and transmits a control signal to create an interface for controlling battery power consumption based on battery power consumed by at least one load when a recharging station is unavailable within the calculated DTE and a display displays the created interface.

14 Claims, 11 Drawing Sheets

(51) Int. Cl.
  *B60W 20/13* (2016.01)
  *B60L 53/30* (2019.01)
  *B60L 58/13* (2019.01)
  *B60K 35/00* (2006.01)

(52) U.S. Cl.
  CPC ............ *B60L 58/13* (2019.02); *B60W 20/13* (2016.01); *G07C 5/0825* (2013.01); *B60K 2370/174* (2019.05); *B60L 2250/16* (2013.01); *B60L 2260/52* (2013.01); *B60L 2260/54* (2013.01); *B60Y 2300/91* (2013.01); *B60Y 2400/112* (2013.01); *Y02T 10/7005* (2013.01); *Y02T 10/705* (2013.01); *Y02T 10/7044* (2013.01); *Y02T 10/7088* (2013.01); *Y02T 90/128* (2013.01); *Y02T 90/163* (2013.01); *Y10S 903/907* (2013.01)

(58) Field of Classification Search
  CPC .. B60W 20/13; G07C 5/0825; B60Y 2300/91; B60Y 2400/112; Y02T 10/7005; Y02T 10/7088; Y02T 90/16; Y02T 90/168; Y04S 30/12; Y10S 903/907
  USPC .......................................................... 701/22
  See application file for complete search history.

(56) References Cited

U.S. PATENT DOCUMENTS

| | | | |
|---|---|---|---|
| 2013/0311016 A1* | 11/2013 | Kim | B60L 11/1862 701/22 |
| 2014/0067225 A1* | 3/2014 | Lee | B60W 50/0097 701/93 |
| 2016/0061610 A1* | 3/2016 | Meyer | G01C 21/26 701/22 |
| 2016/0063772 A1* | 3/2016 | Esler | G07C 5/004 701/123 |
| 2016/0129918 A1* | 5/2016 | Skaff | B60W 50/14 340/455 |
| 2017/0028978 A1* | 2/2017 | Dunlap | B60W 20/13 |
| 2017/0030728 A1* | 2/2017 | Baglino | G01C 21/3469 |

FOREIGN PATENT DOCUMENTS

| | | | |
|---|---|---|---|
| JP | 2012205470 A | * | 10/2012 |
| JP | 2013-005493 A | | 1/2013 |
| KR | 10-2011-0041783 | | 4/2011 |
| KR | 10-2014-0069526 A | | 6/2014 |
| KR | 10-2015-0012776 A | | 2/2015 |
| KR | 10-2015-0116248 A | | 10/2015 |

* cited by examiner

VEHICLE AND METHOD FOR CONTROLLING THE SAME

CROSS-REFERENCE TO RELATED APPLICATION

This application claims priority to and the benefit of Korean Patent Application No. 10-2016-0041445, filed on Apr. 5, 2016, the disclosure of which is incorporated herein by reference in its entirety.

BACKGROUND

1. Field of the Invention

The present disclosure relates to a vehicle for securing extra distance to empty (DTE) of the vehicle by controlling the use of a load that is consuming battery power or by changing driving mode, when a recharging station not detected within DTE of the vehicle at a current battery charge level.

2. Discussion of Related Art

Recent issues of global warming from environmental destruction and oil prices have increased the developments of electric vehicles. Electric vehicles are being developed to alleviate the pollution problem, such as noise and exhaust gas from vehicles and to efficiently use surplus power in terms of energy saving. The electric vehicle charges the battery with electricity, and runs on the battery by driving the motor with the charged electricity. Important factors for operating the electric vehicle including monitoring the battery state, such as current temperature and state of charge (SOC) and managing the battery state to remain greater than a certain level. In particular, and the battery SOC may be monitored in real time to inform the driver of distance to empty (DTE) based on a remaining battery charge level.

In terms of DTE based on a remaining battery charge level, like internal combustion vehicles that estimate DTE based on a current gasoline fuel level and inform the driver of the DTE, the electric vehicles also estimate DTE based on a current battery energy state and indicate the DTE on a cluster within the vehicle or somewhere similar. The electric vehicle runs on a charged battery instead of fuel for gasoline vehicles, but currently, the battery charge performance remains insufficient for the electric vehicle to travel a substantially long distance, and thus the electric vehicle requires regular charging at recharging stations.

Due to the limited charging infrastructure for electric vehicles (EVs), plug in hybrid EVs (PHEVs), etc., which are available today, recharging stations are not sufficiently prevalent yet. An electric vehicle that requires recharging may become discharged when a recharging station is unavailable within the DTE.

Accordingly, the cluster of the electric vehicle provides a warning of recharging through battery SOC indication. Furthermore, a system has been proposed to use a geographic information system to provide the driver with information regarding a recharging station located within a shortest range from the current location of the vehicle and provides the most suitable service for the vehicle, when a voltage level of the battery recognized by the electric vehicle falls below a certain level, thereby providing the driver a warning for charging the electric vehicle.

SUMMARY

The present disclosure provides a vehicle for securing extra distance to empty (DTE) of the vehicle by controlling the use of a load that is consuming battery power or by changing driving mode, when recharging station within DTE of the vehicle is unavailable.

In accordance with one aspect of the present disclosure, a vehicle may include: a distance to empty (DTE) calculator configured to calculate DTE of the vehicle based on a battery charge level; a cluster configured to display the calculated DTE; a controller configured to detect a recharging station located within the calculated DTE, and transmit a control signal to create an interface for adjusting battery power consumption based on battery power consumed by at least one load, when a recharging station is unavailable within the calculated DTE; and a display configured to display the created interface.

The controller may be configured to transmit a control signal to create an interface in relation to the DTE that increases when an operation of the at least one load is stopped, based on battery power consumed by each load. The load may include at least one from the group consisting of an air conditioner (AC), a heater, a navigation system, a digital multimedia broadcasting (DMB) system, an audio system, a heated seat, a cooled seat, a heated steering, and an external device being charged. The controller may further be configured to transmit a control signal to create an interface in relation to an increase in DTE of the vehicle in response to a change in driving mode of the vehicle, based on the battery power consumption in the driving mode of the vehicle.

The display may be configured to display an interface in relation to DTE of a vehicle that increases when the at least one load stops operating. The display may further be configured to display an interface in relation to an increase in DTE of the vehicle in response to a change in driving mode of the vehicle. The DTE calculator may be configured to calculate DTE of the vehicle based on an increase in DTE of the vehicle, determined when an operation of the at least one load is stopped. The DTE calculator may further be configured to calculate DTE of the vehicle based on the changed driving mode when a change in driving mode has been made. The DTE calculator may be configured to calculate DTE of the vehicle at predetermined intervals. The vehicle may further include: a communication unit configured to receive the information regarding a location of a recharging station from an external server. The communication unit may be configured to receive information from the external server regarding a predetermined route that the vehicle is able to travel at the battery charge level, when there a recharging station is unavailable within the calculated DTE.

The vehicle may further include: a storage configured to store information regarding battery power consumption of the respective loads. The storage may be configured to store information regarding battery power consumption in each driving mode of the vehicle. The storage may further be configured to store information regarding locations of recharging stations. The storage may be configured to receive information regarding a predetermined route that the vehicle is able to travel at the battery charge level, when a recharging station is unavailable within the calculated DTE.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
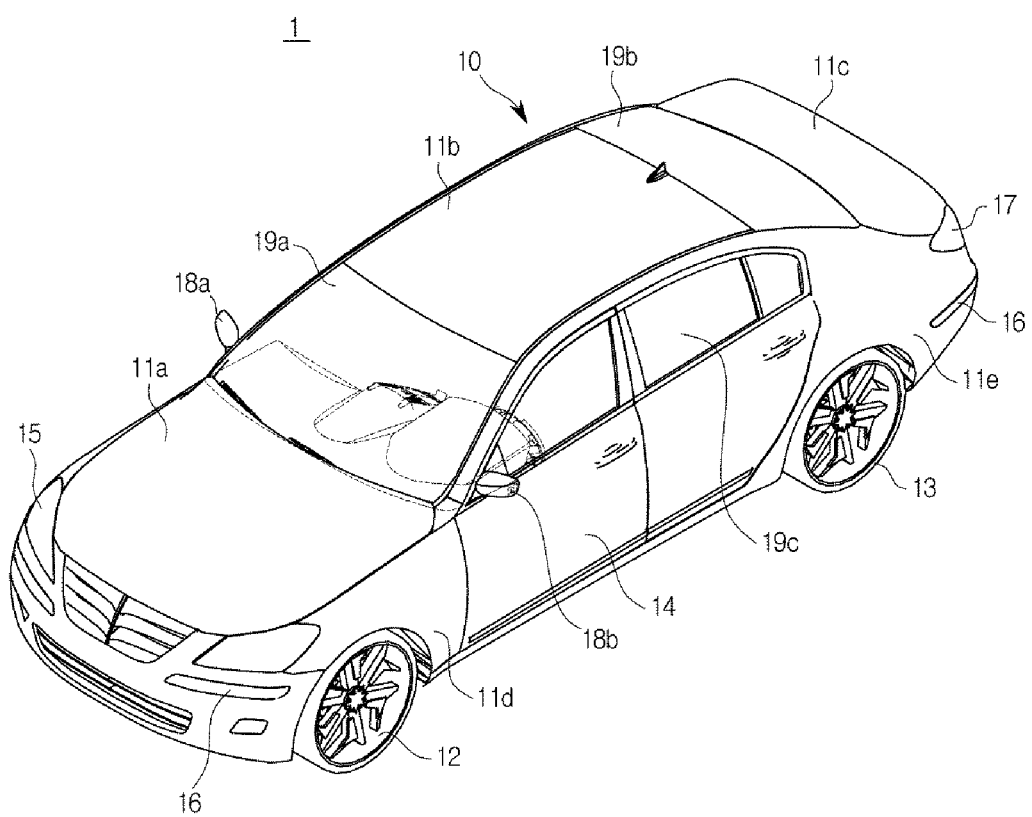
FIG. 1 is a perspective view schematically illustrating the exterior of a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor.

The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages, features, and apparatuses and methods for achieving them will be understood more clearly when the following exemplary embodiments are read with reference to the accompanying drawings. The exemplary embodiments of the disclosure may, however, be embodied in many different forms and should not be construed as limited to the embodiments set forth herein; rather, these exemplary embodiments are provided so that this disclosure will be thorough and complete, and will fully convey the scope of the embodiments of the disclosure to those skilled in the art.

Terms as used herein will be described before detailed description of embodiments of the present disclosure. The terms are selected as common terms widely used now, taking into account principles of the present disclosure, which may however depend on intentions of ordinary people in the art, judicial precedents, emergence of new technologies, and the like. Some terms as herein used are selected at the inventor's discretion, in which case, description thereof will be explained later in detail. Therefore, the terms should be defined based on their meanings and descriptions throughout the specification of the present disclosure.

The term "include (or including)" or "comprise (or comprising)" is inclusive or open-ended and does not exclude additional, unrecited elements or method steps. Furthermore, the term 'unit' or 'module' refers to a software or hardware component, such as FPGA or ASIC which plays some role. However, the unit is not limited to software or hardware. The unit may be configured to be stored in an addressable storage medium, or to execute one or more processors. For example, the unit may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and units may be combined into a less number of components and units, or further divided into a more number of components and units.

A vehicle and method for controlling the same in accordance with exemplary embodiments of the present disclosure will now be described in detail with reference to accompanying drawings to be readily practiced by an ordinary skill in the art. It should be noted that what is not related to the present disclosure is omitted from the drawings. Like reference numerals refer to like components throughout the drawings, and thus the related descriptions that overlap will be omitted.

In the following, however, exemplary embodiments of an electric vehicle that runs on a charged battery by driving a motor with the charged electricity will be described. The term 'electric vehicle' may include all electric vehicles including general electric vehicles, hybrid electric vehicles, fuel cell vehicles equipped with fuel cells, fuel cell hybrid electric vehicles, etc., that are equipped with an electric motor for performing regenerative braking.

FIG. 1 is a perspective view schematically illustrating the exterior of a vehicle, according to an exemplary embodiment of the present disclosure. Referring to FIG. 1, a vehicle 1 may include a vehicle frame 10 that forms the exterior, and wheels 12, 13 for moving the vehicle 1. The vehicle frame 10 may include a hood 11a for protecting various devices required for driving the vehicle 1, such as an engine, a motor, a battery, a transmission, etc., a roof panel 11b that forms the indoor compartment, a trunk lid 11c of a trunk, a font fender 11d arranged on the side of the vehicle 1, and quarter panels 11e. There may be a plurality of doors 15 arranged on the sides of the vehicle frame 10 and hinged with the vehicle frame 10. A front window 19a is arranged between the hood 11a and the roof panel 11b for providing a view ahead of the vehicle 1, and a rear window 19b is arranged between the roof panel 11b and the trunk lid 11c for providing a view behind the vehicle 1. Side windows 19c may also be built into the upper part of the doors 15 to provide side views.

Headlamps 15 may be arranged on the front of the vehicle 1 for lighting a direction in which the vehicle 1 is moving. Turn signal lamps 16 may also be arranged on the front and back of the vehicle 1 for indicating a direction to which the vehicle 1 is going to make a turn. The vehicle 1 may blink the turn signal lamp 16 to indicate a direction to turn to. Tail lamps 17 may also be arranged on the back of the vehicle 1. The tail lamps 17 may indicate a state of gear shift, a state of brake operation, etc. The exterior of the vehicle frame 10 may further include side mirrors 18a, 18b that help the driver view areas behind the vehicle 1. As an electric vehicle, the vehicle 1 may include an engine, a motor, a battery, and a transmission, and a controller 160 of the vehicle 1 may monitor the state of the engine, motor, battery, or transmission by performing controller area network (CAN) communication with a battery controller (not shown) to deliver power to the vehicle 1.

Figure 2:
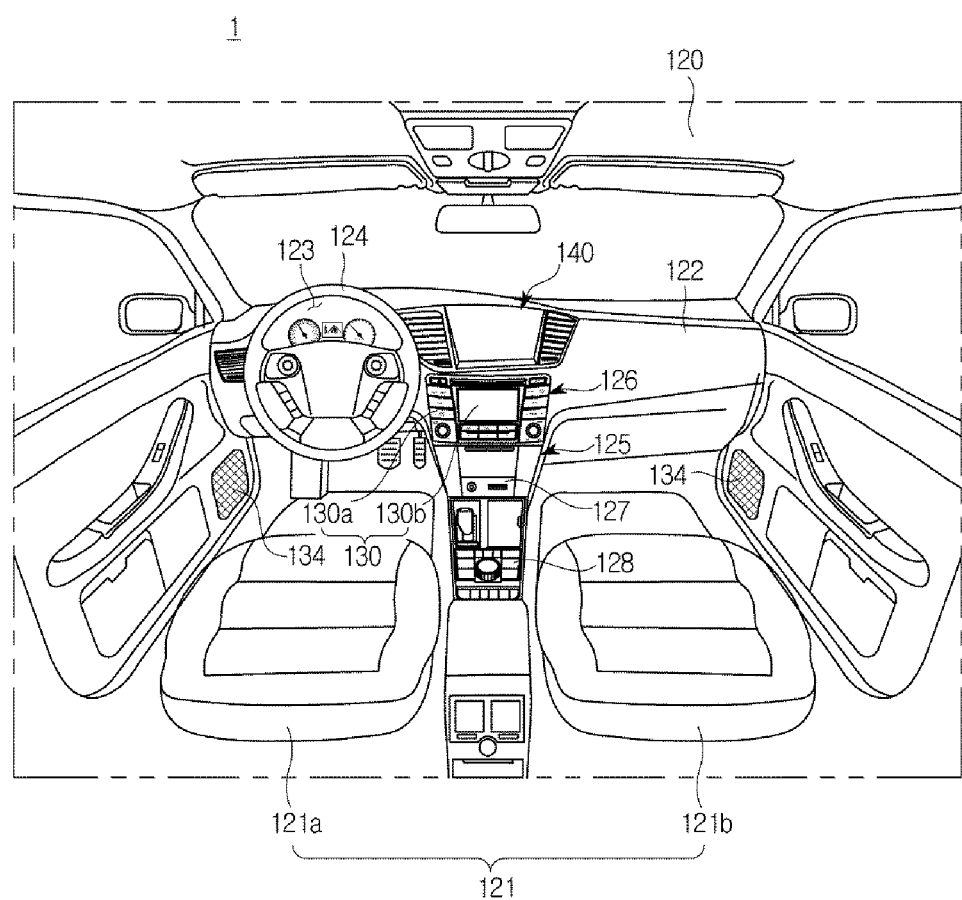
FIG. 2 shows an interior of a vehicle, according to an exemplary embodiment of the present disclosure.

FIG. 2 shows an interior of a vehicle, according to an exemplary embodiment of the present disclosure. Referring to FIG. 2, the interior part 120 of the body may include seats 121, a dashboard 122, an instrument cluster (or cluster) 123 disposed on the dashboard, containing gauges and indicators, such as a tachometer, speedmeter, water temperature gauge, turn signal indicator, head light indicator, warning light, seat belt warning light, odometer, gearshift position indicator, door open warning light, low battery warning light, low oil pressure warning light, etc., a steering wheel 124 for steering control of the vehicle, and a center fascia 125 having air vents of an air conditioner (AC), a control pad, and an audio system arranged thereon.

The seats 121 may include a driver seat 121a, a passenger seat 121b, and a back seat arranged in the back of the interior of the vehicle 1. The cluster 123 may be digitally implemented. For example, the digitally implemented cluster 123 may be configured to display information regarding the vehicle 1 and travel information in an image, and indicate a distance to empty (DTE) of the vehicle 1, which is a possible travel distance of the vehicle 1, calculated based on the battery charge level.

The center fascia 125 is a part of the dashboard 122, disposed between the driver seat 121a and the passenger seat 121b. A head unit 126 for operating the AC and heater system may be mounted on the center fascia 125. The head unit 126 may have various buttons arranged thereon to operate the AC and heater system. A controller configured to operate the AC and heater system may be disposed inside the head unit 126.

Further, the head unit 126 may also include an audio system 130 configured to perform a radio function, an input unit 130a configured to receive operation instructions, and a display 130b configured to display information regarding vehicle operation. The audio system 130 mounted within the vehicle 1 may be the head unit 126 having the radio function, or may be an audio video and navigation (AVN) device which is a vehicle terminal having the radio function. The audio system 130 may be configured to receive and output a broadcast signal. In FIG. 2, the audio system 130 may be mounted into the center fascia 125, in which case a speaker 134 configured to output the broadcast signal from the audio system 130 may be installed on the front doors of the vehicle 1. The location of the speaker 134 illustrated in FIG. 2 is merely by way of example, and it should be noted that the speaker 134 may be installed everywhere in the vehicle.

The display 130b may be configured display information regarding operation of the AC and heater system as well. The display 130b may also be configured to display an interface generated in relation to operation of the vehicle 1, or an interface regarding DTE of the vehicle 1. Additionally, air vents, a cigar jack, etc., may also be installed in the center fascia 125. There may also be a multi-terminal 127 arranged in the center fascia 125, through which an external device including user equipment (UE, not shown) may be wiredly connected. In other words, the multi-terminal 127 may enable wired communication between the head unit 126 or the vehicle terminal 140 and the UE. The multi-terminal 127 may include a universal serial bus (USB) port, an auxiliary (AUX) terminal, and further an SD slot. The multi-terminal 127 may be arranged to be proximate to the vehicle terminal 140 and electrically connected to the vehicle terminal 140 and the external device via a connector or cable. The external device may include a storage device, a UE, an MP3 player, etc., and the storage device may include a card-type memory and an external hard disk. The UE, which is included in the external device, may be a mobile communication device including a smart phone, a laptop, a tablet, etc.

The vehicle 1 may further include a manipulation unit 128 configured to receive instructions to operate various functions. The manipulation unit 128 may be disposed on the head unit 126 and center fascia 125, including at least one mechanical button, such as ON/OFF buttons for operation of various functions, buttons to change settings of various functions, etc. The manipulation unit 128 may be configured to transmit a manipulation signal of a button to a controller in the head unit 126 or the vehicle terminal 140. For example, the manipulation unit 128 may be configured to receive an operation ON/OFF instruction and a selection of a function from among a plurality of functions, and transmit the selected function to the vehicle terminal 140.

Specifically, the manipulation unit 128 may be configured to receive information regarding a destination while the navigation function is selected, and transmit information regarding the information of the destination to the vehicle terminal 140; receive information regarding a broadcasting channel and volume while the DMB function is selected, and transmit the information regarding a broadcasting channel and volume to the vehicle terminal 140; receive information regarding a radio channel and radio volume while the radio function is selected, and transmit the information regarding a radio channel and radio volume to the vehicle terminal 140 or the display 130b.

Further, the manipulation unit 128 may include a touch panel incorporated into the display of the vehicle terminal 140. The manipulation unit 128 may be displayed on the display of the vehicle terminal 140 in the form of at least one button, and may be configured to receive information of the button location. The manipulation unit 128 may also include a jog dial (not shown) or touch pad for the user to input an instruction to move or select a cursor displayed on the display of the vehicle terminal 140. The manipulation unit 128 may be configured to transmit a signal resulting from manipulation of the jog dial or a signal resulting from touching the touch pad to the vehicle terminal 140.

The jog dial or touch pad may be arranged on the center fascia. The manipulation unit 128 may be configured to receive an instruction for automatic channel change while the radio function is being performed. The user may input a control command to change driving mode of the vehicle 1 through the manipulation unit 128, or may input a control command for each component of the vehicle 1. The display 130b may be configured to display information regarding an operation of the head unit 126 and display information input to the manipulation unit 128. For example, the display 130b may be configured to display information regarding a radio channel and radio volume input by the user while the radio function is performed.

The display 130b may further be configured to display information regarding the input instruction for automatic channel change and information regarding the automatic channel change being performed. The vehicle terminal 140 may be detachably installed on the dashboard. The vehicle terminal 140 may be configured to perform audio, video, navigation, DMB, radio, GPS reception functions. Further, the chassis of the vehicle 1 may include a power generating system, a power transfer system, a traveling gear, a steering system, a braking system, a suspension system, a transmission system, a fuel system, front, rear, left, and right wheels, etc.

The vehicle 1 may further include various safety systems for securing safety of the driver and passengers. The safety systems may include an airbag controller for the purpose of the safety of driver and passengers in case of vehicle crashes, and an electronic stability control (ESC) unit configured to stabilize a vehicle position while the vehicle 1 is accelerating.

In addition, the vehicle 1 may include detection devices, such as approximation sensors configured to detect an obstacle or other vehicles surrounding the vehicle, a rain sensor configured to detect a rain condition and an amount of rainfall, wheel speed sensors configured to detect speed of the front, back, left and right wheels, an acceleration sensor configured to detect acceleration of the vehicle 1, an angular speed sensor configured to detect steering angle of the vehicle 1, etc. The vehicle 1 may include an electronic control unit (ECU) configured to execute operation of the power generating system, power transfer system, traveling gear, steering system, braking system, suspension system, transmission system, fuel system, battery control system, various safety systems and detection devices.

Furthermore, the vehicle 1 may also include electronic devices, such as a hands-free system, Bluetooth device, a rear camera, a charging system for UE, E-Z pass (e.g., highway toll passes) equipment, etc. The vehicle 1 may further include an engine start button to provide an operation instruction to a start motor (not shown). Specifically, pushing or engaging the engine start button may start the motor, which in turn drives the power generating system, i.e., an engine (not shown).

The vehicle 1 may include a battery (not shown) electrically connected to a terminal, audio system, indoor lighting system, start motor, and other electronic devices configured to supply power. A battery is used for driving the vehicle 1, which is an electric vehicle, i.e., the electric vehicle runs on battery power by charging the battery and driving the motor with electricity from the charged battery. The battery may be charged using power of a self-excited generator or an engine, or may be charged at a recharging station.

The vehicle 1 may further include a communication device configured to provide communication among the internal electronic devices and communication with an external device, such as the UE. The communication device may include a controller area network (CAN) module, a wireless fidelity (Wi-Fi) communication module, a USB module, and a Bluetooth communication module. The communication device may further include a broadcasting communication module, such as TPEG, SXM, RDS, etc., for e.g., DMB.

Figure 3:
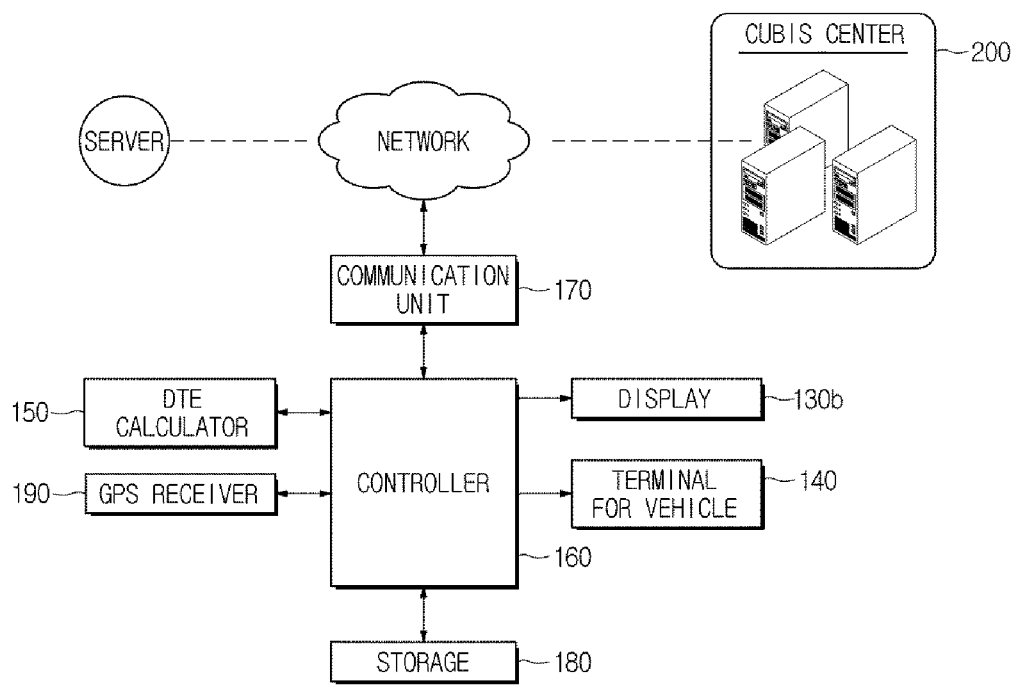
FIG. 3 is a control block diagram of a vehicle, according to an exemplary embodiment of the present disclosure.
Figure 4:
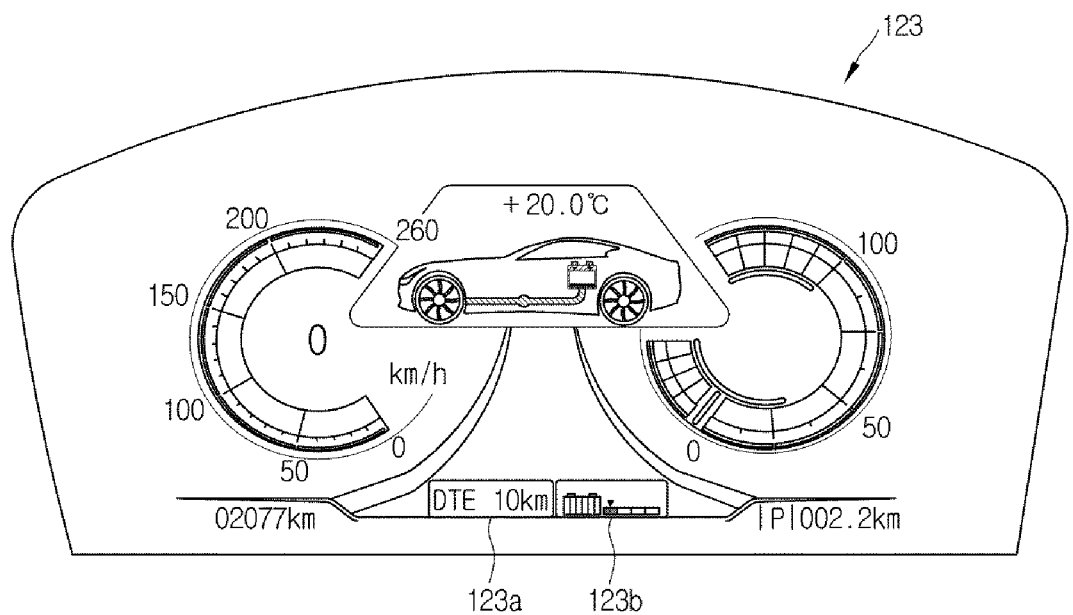
FIG. 4 shows a cluster indicating distance to empty (DTE) of a vehicle, according to an exemplary embodiment of the present disclosure.
Figure 5:
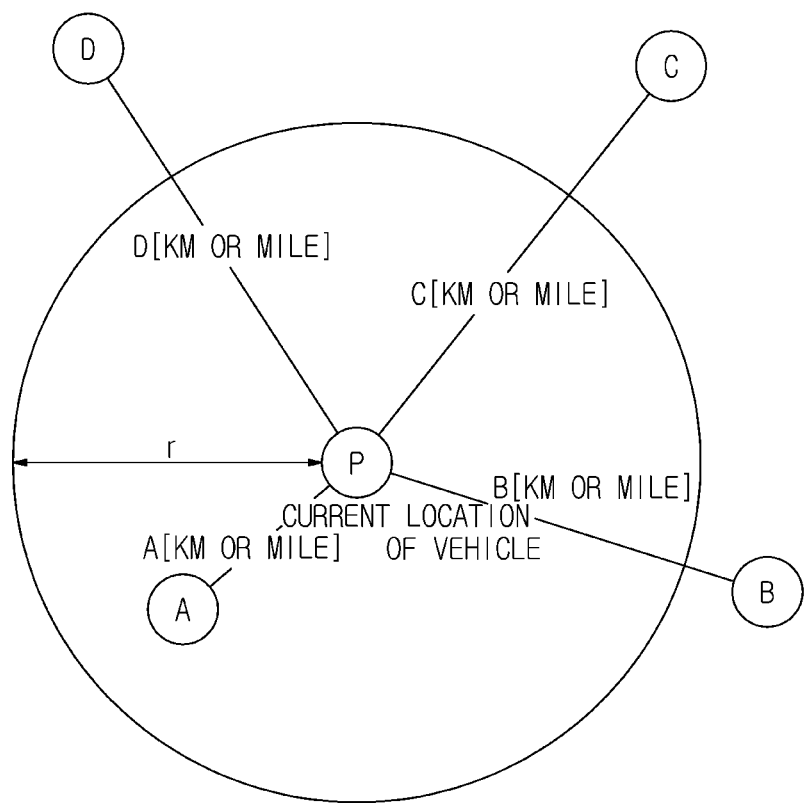
FIG. 5 is a conceptual diagram of discovering recharging stations located within DTE of a vehicle, according to an exemplary embodiment of the present disclosure.

FIG. 3 is a control block diagram of a vehicle, according to an exemplary embodiment of the present disclosure, FIG. 4 shows a cluster indicating DTE of a vehicle, according to an exemplary embodiment of the present disclosure, and FIG. 5 is a conceptual diagram of discovering recharging stations located within DTE of a vehicle, according to an exemplary embodiment of the present disclosure. Referring to FIG. 3, the vehicle 1 may include a display 130b, a terminal for vehicle 140, a DTE calculator 150, a controller 160, a communication unit 170, a storage 180, and a GPS receiver 190. The controller 160 may be configured to operate the other various components of the vehicle.

Particularly, the DTE calculator 150 may be configured to calculate DTE of the vehicle 1 based on a battery charge level, i.e., a distance that the vehicle 1 is able to travel at the current battery charge level. The DTE of the vehicle 1 may include a learned DTE calculated using average electricity consumption accumulated and stored for the past charging cycles, and a section DTE calculated using average electricity consumption for a certain interval in this one-time charging cycle.

The DTE calculator 150 may be configured to calculate DTE in a driving mode of the vehicle 1 by periodically reading in (e.g., detecting) information regarding a battery charge level stored in the storage 180, and calculate DTE based on the battery charge level and speed of the vehicle 1 at the request of the controller 160. The DTE calculator 150 may further be configured to calculate DTE of the vehicle 1 and transmit the calculated data to the controller 160, and/or to the head unit 126 and the terminal for vehicle 140. The DTE calculator 150 may then be configured to transmit the calculated DTE data to the controller 160 via CAN communication.

Additionally, the DTE calculator 150 may be configured to calculate DTE of the vehicle 1 at predetermined time or intervals. Thus, the DTE calculator 150 may be configured to calculate and transmit the DTE to the controller 160 in real time by reflecting battery consumption that changes based on a driving mode or respective loads built into the vehicle 1 while the vehicle 1 is running or traveling (e.g., being driven). For example, the DTE calculator 150 may be configured to calculate DTE of the vehicle 1 at about five-minute intervals.

The loads built into the vehicle 1 may include an air conditioning system, such as an AC, a heater, etc., an AVN system including navigation, DMB, and audio systems, and user facilities including heated seats, cooled seats, a heated steering wheel, etc. When an external device is connected to the multi-terminal 127 for data communication or charging, the external device may also correspond to the load. The external device may include a storage device, such as a card-type memory and an external hard disc, a UE that corresponds to a mobile communication terminal, such as a smart phone, a laptop, a tablet, etc., and an mp3 player. The DTE calculated by the DTE calculator 150 may be displayed on the cluster 123. In this regard, the cluster 123 may be configured to display changed DTE calculated in real time by the DTE calculator 150 at predetermined intervals or at predetermined time.

Referring to FIG. 4, the driver may check the remaining battery charge level 123b and DTE 123a displayed on the cluster 123. The remaining battery charge level 123b may be represented by a current battery charge level of the vehicle 1 in various forms. The DTE 123a represents a distance that the vehicle is able to travel at the remaining battery charge level 123b (e.g., a travel distance until battery discharge), and thus, the driver may recognize the distance that the vehicle is able to travel at the current battery charge level through the DTE 123a. As shown in FIG. 4, when DTE is displayed as "10 km", the vehicle 1 may travel an additional 10 Km in the current driving mode and on the battery being consumed by the loads built into the vehicle 1.

As described above, the DTE calculator 150 may be configured to calculate DTE of the vehicle 1 in real time at predetermined intervals or time, and thus the DTE 123a displayed by the cluster 123 may be changed at the predetermined intervals or time. The controller 160 may be configured to detect recharging stations located within the DTE calculated by the DTE calculator 150. The controller 160 may be a telematics unit (TMU) configured to operate the vehicle 1.

Information regarding locations of local recharging stations may be stored in the storage 180 in advance and provided for the controller 160 to detect a recharging station. Alternatively, the information regarding a location of a recharging station may be received from an external server via the communication unit 170, or may be received from a car ubiquitous system (CUbiS) center 200 connected over a network. The CUbiS center 200 may include the information regarding locations of recharging stations, and may enable the vehicle 1 to receive various vehicle-related services by communicating with the controller 160 of the vehicle 1 via the communication unit 170.

When the GPS receiver 190 of the vehicle 1 transmits information regarding a current location of the vehicle 1 received from GPS satellites to the CUbiS center 200 via the communication unit 170, the CUbiS center 200 may be configured to provide information regarding a location of a recharging station nearest to the current location of the vehicle 1. The communication unit 170 may include at least one of a Bluetooth communication module that communicates one-to-one or one-to-many with the CUbiS center 200, a wireless fidelity (Wi-Fi) communication module that accesses a local area network (LAN) through a wireless access point (AP), and a short-range communication module, such as a Zigbee communication module that forms a short-range communication network with the CUbiS center 200. However, the communication module included in the communication unit 170 is not limited to the Bluetooth communication module, the Wi-Fi communication module, and the short-range communication module, but may include any other communication module for performing communication according to various communication protocols.

The controller 160 may be configured to determine the DTE of the vehicle 1 using the current location of the vehicle 1, and may be configured to compare the current DTE of the vehicle 1 and a distance to a recharging station from the vehicle based on the information regarding the current location of the vehicle 1, which is received by the GPS receiver 190, and the information regarding the location of the recharging station.

Referring to FIG. 5, under the assumption that the vehicle 1 is currently located at point P, and DTE of the vehicle 1 at the current battery charge level is r, the controller 160 may be configured to detect recharging stations located within the DTE, r from the current vehicle location P. FIG. 5 further shows a recharging station A, which is 'a' km or miles away from the current vehicle location P within the DTE, r. The driver may then charge the battery at the recharging station A based on the current battery charge level of the vehicle 1.

Since recharging stations B, C, and D, which are 'b', 'c', and 'd' km or miles away, respectively, from the current vehicle location P are not within the DTE, r, the driver of the vehicle 1 is unable to charge the battery at the recharging stations B, C, and D based on the current battery charge level of the vehicle 1. Since the vehicle 1 may be stopped (e.g., the battery may be discharged thus preventing vehicle travel) before arriving at the recharging station according to the DTE calculated based on the current battery consumption, the controller 160 be configured to prompt the driver to change the driving mode or stop using a load that is currently consuming the battery.

Accordingly, the controller 160 may be configured to detect a recharging station located within the DTE, r, of the vehicle 1, and when no recharging station is discovered within the DTE, r, the controller 160 may be configured to transmit a control signal to create an interface for adjusting power consumption of the battery based on battery power consumed by at least one load built into the vehicle 1. For example, the controller 160 may be configured to transmit control signals to create an interface in relation to current battery consumption of the vehicle 1, an interface in relation to DTE that increases when operation of at least one load is stopped, and an interface in relation to an increase in DTE of the vehicle 1 resulting from a change in driving mode of the vehicle 1.

The display 130b may be configured to display the interface created based on the control signal sent from the controller 160, and the driver may check the interface through the display 130b and change driving mode of the vehicle 1 or stop operation of a load to reduce battery consumption. The interface created based on the control signal transmitted by the controller 160 may be displayed on the terminal for vehicle 140 in addition to the display 130b.

Figure 6:
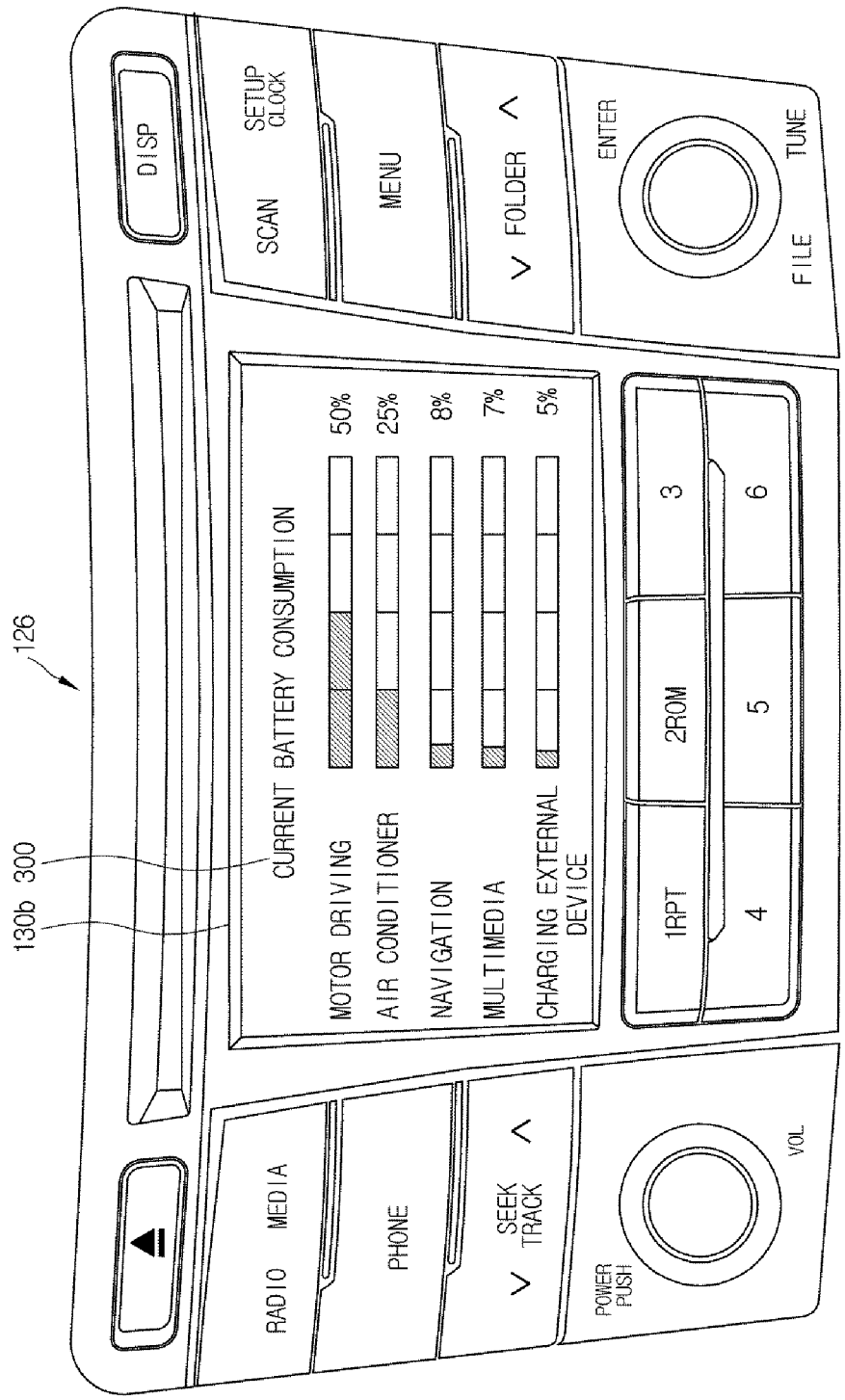
FIG. 6 shows a screen that displays battery consumption, according to an exemplary embodiment of the present disclosure.

FIG. 6 shows a screen that displays battery consumption, according to an exemplary embodiment of the present disclosure. Referring to FIG. 6, the controller 160 may be configured to transmit a control signal to create an interface to inform the driver of battery power consumption, and the display 130b may be configured to display the interface 300 in relation to the battery consumption. As shown in FIG. 6, the driver may check the display 130b and recognize that driving the motor to move the vehicle 1 accounts for about 50% of battery consumption, which is the largest part of the whole battery consumption, operating the air conditioner accounts for about 25% of battery consumption, using the navigation system to find a route to a destination, about 8%, using multimedia system including audio listening or DMB watching, about 7%, and charging an external device, about 5%.

The controller 160 may be configured to calculate battery consumption in driving the motor taking into account the current speed and driving mode of the vehicle 1, and calculate battery consumption in activating air conditioner or heater by estimating an air conditioning load used to cool or heat the inside of the vehicle 1 based on outside temperature, inside temperature, current temperature, and target temperature. The controller 160 may be configured to calculate current battery consumption by calculating average battery power consumed by the navigation system or the multimedia system, and calculate battery consumption based on a target power level to charge an external device and how the charging is going.

Figure 7:
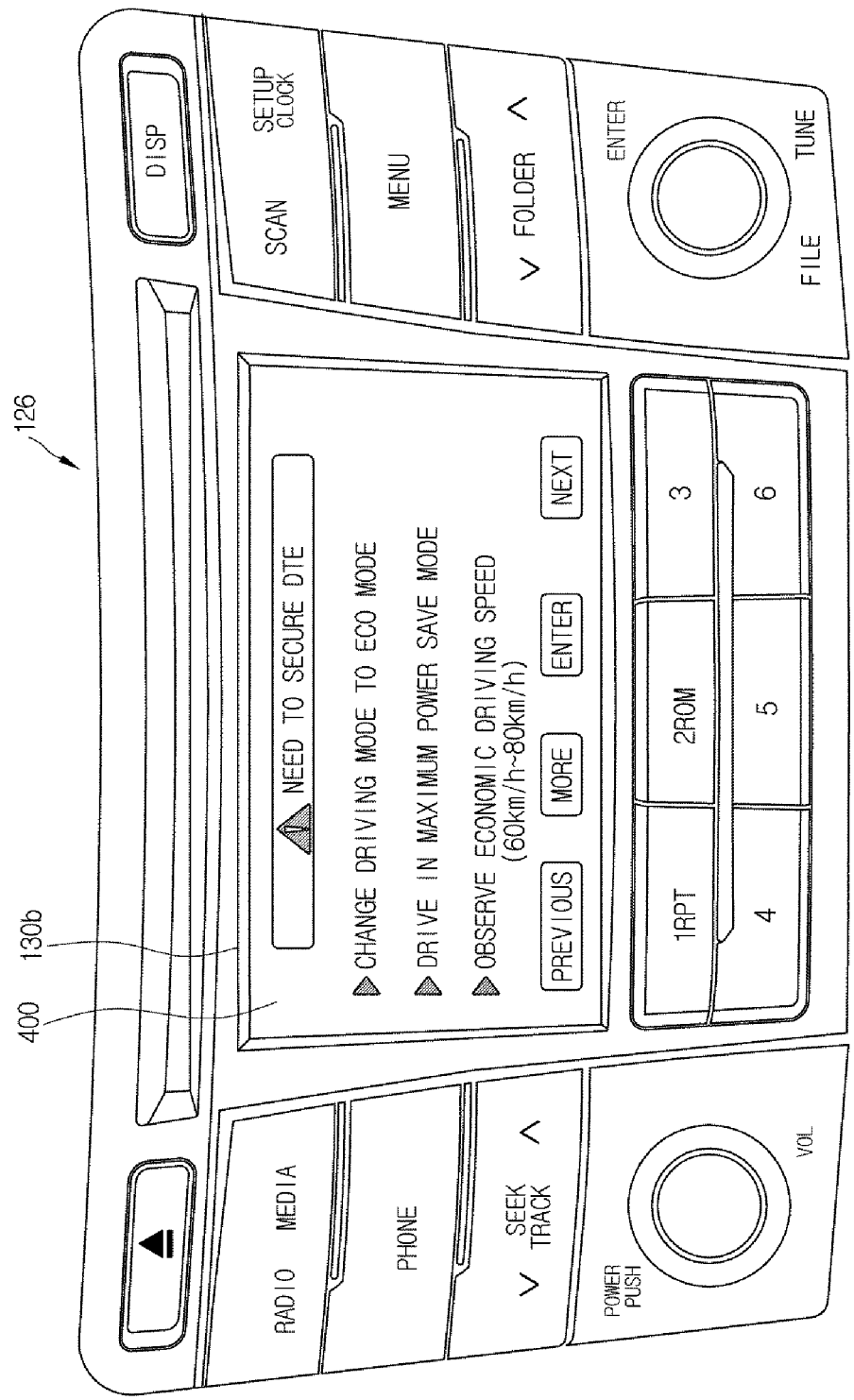
FIG. 7 shows a screen that displays an interface in relation to changing driving mode of a vehicle, according to an exemplary embodiment of the present disclosure.

FIG. 7 shows a screen that displays an interface in relation to changing driving mode of a vehicle, according to an exemplary embodiment of the present disclosure. Referring to FIG. 7, when a recharging station is unavailable within DTE of the vehicle 1, the controller 160 may be configured to transmit a control signal to create an interface for the driver to change the driving mode of the vehicle 1, and may further transmit a control signal to create an interface in relation to DTE of the vehicle 1 that increases based on the change in driving mode.

Specifically, the controller 160 may be configured to calculate battery power consumption that corresponds to the driving mode based on average battery consumption, driving speed of the vehicle 1, and battery consumption in acceleration or deceleration in the current driving mode, and data regarding driving habits of the driver. From this, the controller 160 may be configured to determine a driving mode to additionally secure DTE required for the vehicle 1 to move to a point or location where a recharging station is located, and may be configured to transmit a control signal to create an interface to inform the driver of the determined driving mode. As shown in FIG. 7, the display 130b may be configured to display an interface 400 for the driver to change driving mode of the vehicle 1. For example, the driver may check the interface and change driving mode to a mode for observing the speed limit, an economical mode (Eco mode), a power-saving driving mode, etc., to reduce battery consumption to additionally secure DTE of the vehicle 1.

Figure 8:
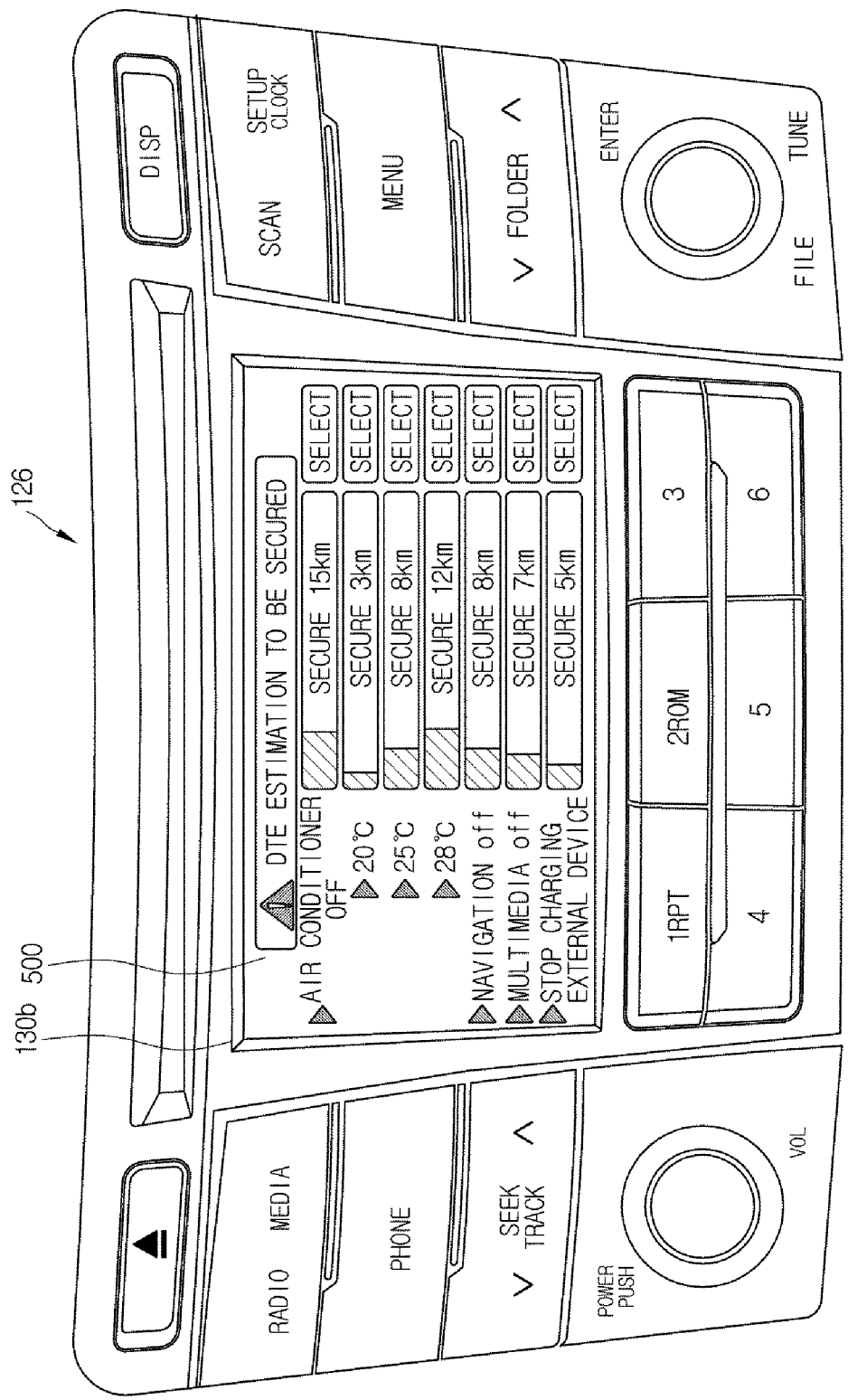
FIG. 8 shows a screen that displays an interface in relation to DTE of a vehicle that increases when a load stops operating, according to an exemplary embodiment of the present disclosure.

FIG. 8 shows a screen that displays an interface in relation to DTE of a vehicle that increases when a load stops operating, according to an exemplary embodiment of the present disclosure. Referring to FIG. 8, the controller 160 may be configured to transmit a control signal to create an interface in relation to DTE of the vehicle 1 that increases when operation of a load that is consuming battery power is stopped, when a recharging station within the DTE of the vehicle 1 is unavailable, and the display 130b may be configured to display the created interface.

As described above in connection with FIG. 6, the controller 160 may be configured to calculate battery consumption for each load, and calculate DTE to be additionally secured when operation of the load is stopped, based on the calculated battery consumption for the load. Specifically, the controller 160 may be configured to estimate an air conditioning load in cooling or heating the inside of the vehicle 1 based on outside temperature, inside temperature, current temperature, and target temperature and accordingly, calculate current battery power consumed when the air conditioner or heater is operating, and may be configured to calculate DTE to be additionally secured based on battery power to be saved by stopping operation of the air conditioner or heater.

Furthermore, the controller 160 may be configured to calculate current battery consumption by estimating average battery power consumed by the navigation or multimedia system and accordingly, calculate DTE to be additionally secured based on battery consumption to be saved when operation of the navigation or multimedia system is stopped. In addition, the controller 160 may be configured to calculate DTE to be additionally secured based on battery consumption that may be saved in case of stopping charging an external device connected to the vehicle 1 based on a target power level to finish charging.

Referring to FIG. 8, the controller 160 may be configured to transmit a control signal to create an interface to inform the driver that DTE to be additionally secured is about 15 Km from the battery consumption that may be saved when stopping an operation of the air conditioner of the vehicle 1, and the display 130b may be configured to display the interface.

Since the battery power consumed by the air conditioner may vary based on the outside temperature, inside temperature, current temperature, and target temperature, just changing the target temperature without stopping operation of the air conditioner as shown in FIG. 8 may change the DTE to be secured. For example, about 3 km of DTE may be secured with about 20° C. of target temperature, about 8 km may be secured with about 25° C., and about 12 km may be secured with about 28° C. Accordingly, the driver may additionally secure DTE by changing the target temperature of the air conditioner through the interface displayed in the display 130b without turning off the air conditioner to save battery power consumption.

Moreover, the controller 160 may be configured to transmit a control signal to create an interface to inform the driver that DTE to be additionally secured is about 8 km from the battery consumption that may be saved when stopping an operation of the navigation system of the vehicle 1, and the display 130b may be configured to display the interface. In addition, the controller 160 may be configured to transmit a control signal to create an interface to inform the driver that DTE to be additionally secured is about 7 km from the battery consumption that may be saved when stopping an operation of the multimedia system of the vehicle 1, such as DMB, audio, etc., and the display 130b may be configured to display the interface.

Similarly, the controller 160 may be configured to transmit a control signal to create an interface to inform the driver that DTE to be additionally secured is about 5 km from the battery consumption that may be saved when stopping charging an external device, and the display 130b may be configured to display the interface. The driver may check the interface displayed in the display 130b and control operation of a load built into the vehicle 1. The drive may input a control command to control operation of the load by touching an item or indicator such as 'select' on the interface, or the operation of the load may be executed by the controller 160. The controller 160 may be configured to adjust operation of a load built into the vehicle 1 based on preference settings of the vehicle 1 set in advance, instead of the driver adjusting operation of the load.

Figure 9:
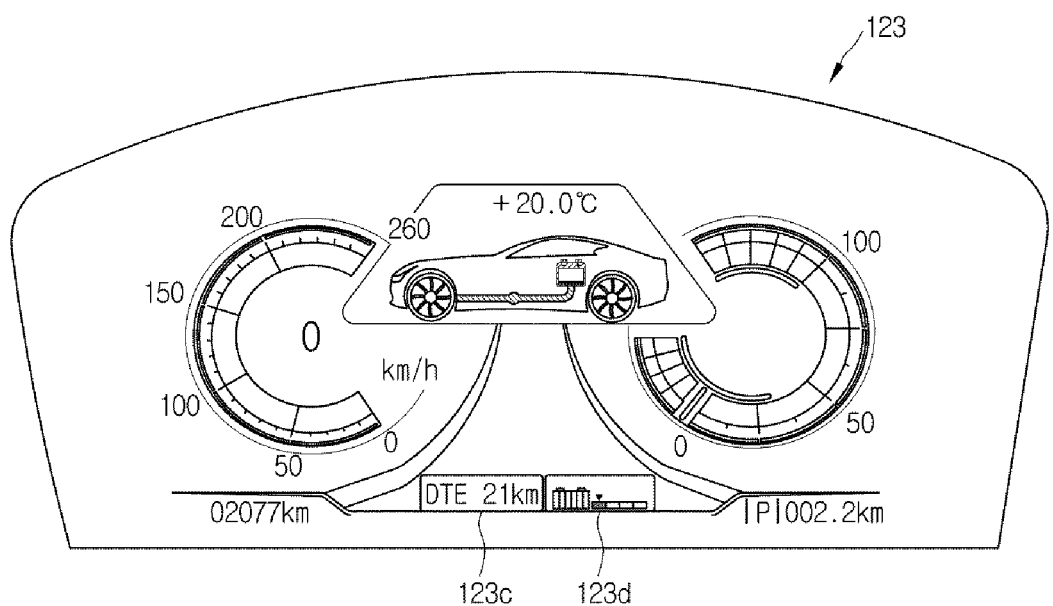
FIG. 9 shows a cluster indicating a changed DTE of a vehicle, according to an exemplary embodiment of the present disclosure.

FIG. 9 shows a cluster indicating a changed DTE of a vehicle, according to an exemplary embodiment of the present disclosure. As described above, when the driver stops operation of at least one load or changes the driving mode of the vehicle 1, the DTE calculator 150 may be configured to calculate a new DTE of the vehicle 1 by reflecting an increase of DTE as the operation of the load is stopped or the driving mode is changed.

Since the DTE calculator 150 may be configured to calculate DTE of the vehicle 1 at predetermined time or intervals, the DTE calculator 150 may be configured to calculate and transmit DTE to the controller 160 in real time by reflecting battery consumption changed in real time as the driver stops an operation of at least one load or changes the driving mode. The controller 160 may be configured to detect recharging stations located within the changed DTE of the vehicle 1 received from the DTE calculator 150. The cluster 123 may be configured to display the DTE calculated by the DTE calculator 150, and the driver may stop an operation of the load or change the driving mode while checking the DTE displayed on the cluster 123, and check the newly secured DTE.

As shown in FIG. 9, the remaining battery charge level 123d and the changed DTE 123c may be displayed on the cluster 123. Even when the remaining battery charge level 123d remains the same, battery consumption may be saved when the operation of a load is stopped or the driving mode is changed, and thus DTE of the vehicle 1 may increase. For example, with about 10 km of DTE displayed on the cluster 123 as shown in FIG. 4, the vehicle 1 may travel about 10 km at the remaining battery charge level. However, the DTE may be increased to about 21 km as shown in FIG. 9 when the operation of a load or driving mode is changed. Accordingly, the driver may secure DTE by stopping an operation of a load or changing the driving mode and thus the vehicle 1 may travel about 11 km farther.

The controller 160 may be configured to detect a recharging station located within the changed DTE, and when recharging station is unavailable within the changed DTE, the controller 160 may be configured to transmit a control signal to create an interface to adjust battery power consumption as described above. The controller 160 may be implemented in an array of multiple logic gates, or in a combination of a universal microprocessor and a memory that stores a program executable in the microprocessor.

Figure 10:
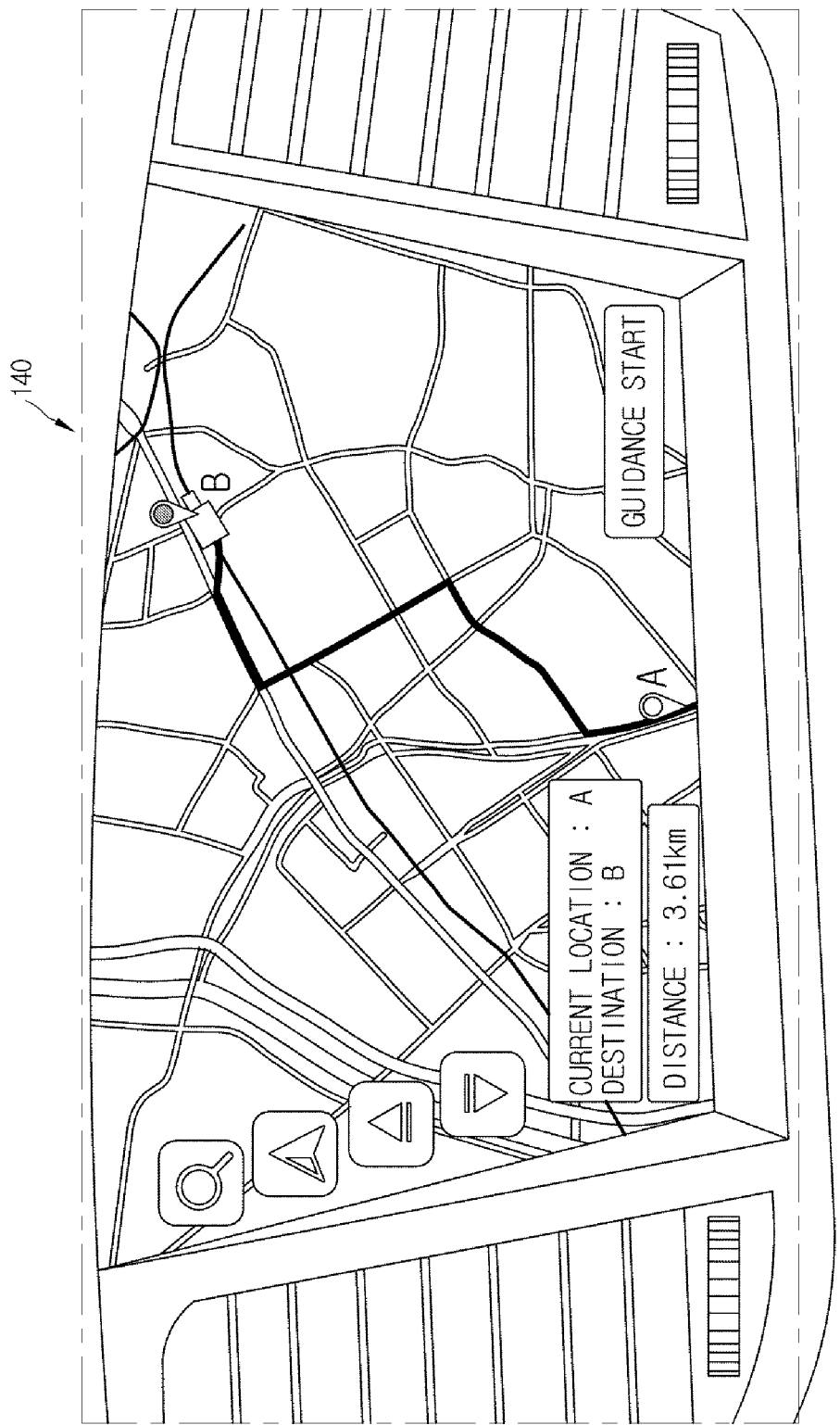
FIG. 10 shows receiving a predetermined route for a vehicle to go at a battery charge level of the vehicle, according to an exemplary embodiment of the present disclosure.

FIG. 10 shows receiving a predetermined route for a vehicle to go based on a battery charge level of the vehicle, according to an exemplary embodiment of the present disclosure. As described above, the controller 160 may be configured to detect recharging stations located within the DTE of the vehicle 1 calculated by the DTE calculator 150, and when a recharging station is unavailable within the DTE, the controller 160 may be configured to transmit a control signal to create an interface to prompt the driver to adjust the battery power consumption. The driver may additionally secure DTE by stopping an operation of a load built into the vehicle 1 or changing the driving mode through the interface displayed in the display 130b, and the controller 160 may be configured to detect whether there is a recharging station within the changed DTE.

Further, there is a need for a roadside assistance to tow the vehicle 1 or temporarily charging the battery of the vehicle 1, when a recharging station is unavailable within the changed DTE additionally secured by the driver stopping an operation of a load or changing the driving mode, and the vehicle 1 might be stopped (e.g., not capable of traveling further) before arriving at a recharging station. Accordingly, the CUbiS center 200 may be configured to detect the location of the vehicle 1, and transmit information regarding a location of a point at which the roadside assistance may be offered or information regarding a route to the point from the current location of the vehicle 1, based on the DTE that the vehicle 1 may travel at the current remaining battery charge level of the vehicle 1.

In this regard, the communication unit 170 may be configured to transmit the CUbiS center 200 the information regarding the current location of the vehicle 1, as well as information regarding the current battery charge level of the vehicle 1 and information regarding the DTE that the vehicle 1 may travel at the current battery charge level. As shown in FIG. 10, the CUbiS center 200 may be configured to transmit a route from the current location A of the vehicle 1 to the point B where the roadside assistance may be offered. The CUbiS center 200 may be configured to set a shortcut from A to B taking into account DTE based on the current battery charge level of the vehicle 1, and information regarding the shortcut may be delivered to the controller 160 via the communication unit 170 of the vehicle 1.

Such information as the route from the current location A of the vehicle 1 to the point B at which the roadside assistance may be offered may be received by the vehicle 1 from the CUbiS center 200, or may be learned and stored in the storage 180 in advance and then provided to the controller 160 directly from the storage 180. The controller 160 may be configured to display the received route information on the terminal for vehicle 140, and the driver may drive the vehicle 1 to the point B, at which the roadside assistance may be offered, based on the route information displayed on the terminal for vehicle 140. The route information received from the CUbiS center 200 may be displayed in the terminal for vehicle 140 and also in the display 130b.

The storage 180 may be configured to store information regarding operation and control of the vehicle 1. For example, the storage 180 may be configured to store information regarding locations of local recharging stations, and information regarding battery power consumption for each load. The storage 180 may also be configured to store information regarding battery power consumption for the respective driving modes of the vehicle 1 and information regarding DTE calculated by the DTE calculator 150. The storage 180 may be implemented with volatile memory devices, such as Read Only Memory (ROM), Programmable Read Only Memory (PROM), Erasable Programmable Read Only Memory (EPROM), and flash memory, non-volatile memory devices, such as Random Access Memory (RAM), hard disks or optical disks. Furthermore, the storage 180 may be detachable from the vehicle 1. For example, the storage 180 may include a compact flash (CF) card, a secure digital (SD) card, a smart media (SM) card, a multimedia card (MMC), or a memory stick, but is not limited thereto. The storage 180 may be equipped extraneous to the vehicle 1 for transmitting or receiving data to or from the vehicle 1.

Figure 11:
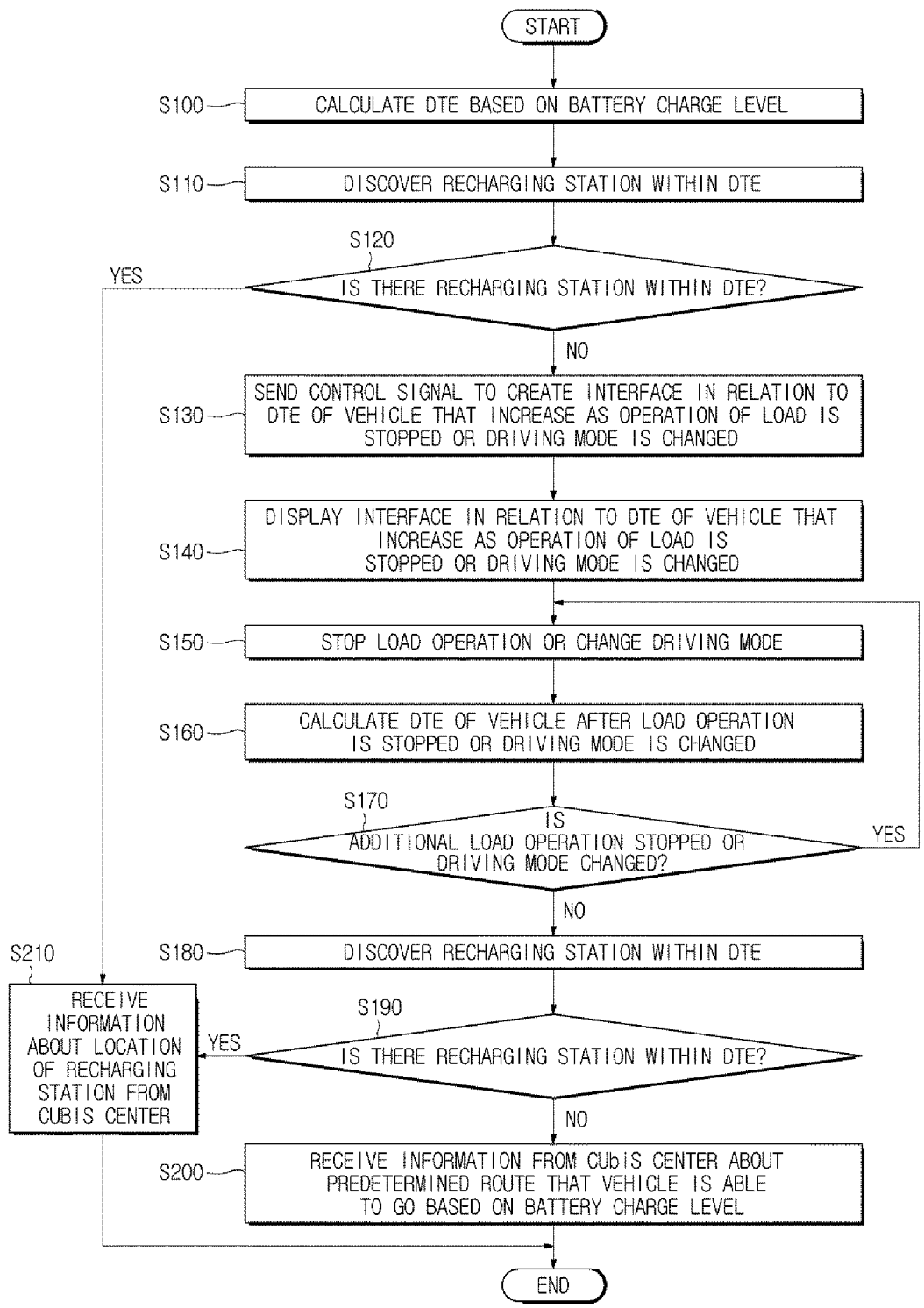
FIG. 11 is a flowchart illustrating a method for controlling a vehicle, according to an exemplary embodiment of the present disclosure.

FIG. 11 is a flowchart illustrating a method for controlling a vehicle, according to an exemplary embodiment of the present disclosure. Referring to FIG. 11, the DTE calculator 150 may be configured to calculate DTE of the vehicle 1 based on a battery charge level for driving the vehicle 1, in step S100. The DTE calculator 150 may be configured to calculate DTE of the vehicle 1 at predetermined time or intervals. Thus, the DTE calculator 150 may be configured to calculate and transmit the DTE to the controller 160 in real time by reflecting battery consumption that changes based on a driving mode or the respective loads built into the vehicle 1 while the vehicle 1 is running. For example, the DTE calculator 150 may be configured to calculate DTE of the vehicle 1 at about five-minute intervals.

The controller 160 may be configured to detect recharging stations located within the DTE calculated by the DTE calculator 150, in step S110. Information regarding locations of local recharging stations may be stored in the storage 180 in advance and provided for the controller 160 to discover a recharging station. Alternatively, the information regarding a location of a recharging station may be received from an external server via the communication unit 170, or may be received from the CUbiS center 200 connected via a network. The detection of a recharging station within DTE was described in connection with FIG. 5, so the description will be omitted herein.

The controller 160 may be configured to determine when there is a recharging station within DTE of the vehicle 1, in step 120, and when there is a recharging station within the calculated DTE, the controller 160 may be configured to operate the communication unit 170 to receive information regarding the location of the recharging station from the CUbiS center 200, in step S210. The driver may thus travel to the recharging station based on the received information regarding the location of the recharging station to charge the battery of the vehicle 1. Otherwise, when a recharging station is detected to be unavailable within the calculated DTE, the controller 160 may be configured to transmit a control signal to create an interface in relation to DTE of the vehicle 1 that increases as the operation of at least one load built into the vehicle 1 is stopped or the driving mode is changed, in step S130.

The display 130b may be configured to display the interface based on the control signal transmitted from the controller 160, in step S140, and the driver may check the interface and change a driving mode of the vehicle 1 or stop an operation of a load, in step S150, to reduce battery consumption. When the driver stops an operation of the at least one load or changes the driving mode of the vehicle 1, the DTE calculator 150 may be configured to calculate new DTE of the vehicle 1 by reflecting an increase of DTE as the operation of the load is stopped or the driving mode is changed, in step S160.

The new DTE calculated by the DTE calculator 150 may be displayed on the cluster 123, and the driver may then stop an operation of a load or change the driving mode, in step S170. The controller 160 may be configured to detect recharging stations located within the changed DTE calculated by the DTE calculator 150, in step S180. The controller 160 may be configured to determine from the discovery result when there is a recharging station within the changed DTE of the vehicle 1, in step 190, and when there is a recharging station within the changed DTE, the controller 160 may be configured to operate the communication unit 170 to receive information regarding the location of the recharging station from the CUbiS center 200, in step S210. The driver may thus travel to the recharging station based on the received information regarding the location of the recharging station to charge the battery of the vehicle 1.

In response to detecting that a recharging station is unavailable within the changed DTE, and it is impossible to additionally secure DTE any more even by stopping operation of a load or changing the driving mode, the communication unit 170 may be configured to receive information regarding a predetermined route that the vehicle 1 may travel based on the current battery charge level, from the CUbiS center 200, in step S200. For example, the CUbiS center 200 may be configured to detect the location of the vehicle 1, and transmit information regarding a location of a point at which the roadside assistance may be offered or information regarding a route to the point from the current location of the vehicle 1 based on the DTE that the vehicle 1 may travel at the current remaining battery charge level of the vehicle 1. The driver may drive the vehicle 1 to the destination based on the received route information, and may be offered the roadside assistance at the predetermined point.

According to exemplary embodiments of the present disclosure, the electric vehicle may be offered information regarding a customized recharging station by discovering recharging stations located within DTE of the electric vehicle and providing the information to the user in real time. Furthermore, when there is no recharging station located within DTE of the electric vehicle, the electronic vehicle may increase DTE by adjusting the use of a load that is consuming battery power or changing driving mode.

The exemplary embodiments of a vehicle and method for controlling the same are only by way of example, and the present disclosure is not limited to the exemplary embodiments. Accordingly, the scope of the present disclosure should be construed as including all the modifications or other various exemplary embodiments based on the technical idea of the present disclosure. The scope of the present disclosure should be defined only by the following claims, and all the equivalents of the exemplary embodiments may also be construed to be in the scope of the present disclosure.

DESCRIPTION OF THE SYMBOLS

123: CLUSTER
126: HEAD UNIT
130b: DISPLAY
140: TERMINAL FOR VEHICLE
150: DTE CALCULATOR
160: CONTROLLER
170: COMMUNICATION UNIT
180: STORAGE
190: GPS RECEIVER
200: CUbiS CENTER

What is claimed is:

1. A vehicle comprising:
   a distance to empty (DTE) calculator configured to calculate DTE of the vehicle based on a battery charge level;
   a cluster configured to display the calculated DTE;
   a controller configured to detect a recharging station located within the calculated DTE, and transmit a control signal to create an interface for adjusting battery power consumption based on battery power consumed by at least one load, when the recharging station is unavailable within the calculated DTE; and
   a display configured to display the created interface,
   wherein the controller is configured to transmit a control signal to create the interface in relation to the DTE that increases when an operation of each load is stopped, based on battery power consumed by each load.

2. The vehicle of claim 1, wherein the load includes at least one selected from the group consisting of: an air conditioner (AC), a heater, a navigation system, a Digital Multimedia Broadcasting (DMB) system, an audio system, a heated seat, a cooled seat, a heated steering, and an external device being charged.

3. The vehicle of claim 1, wherein the controller is configured to transmit a control signal to create the interface in relation to an increase in DTE of the vehicle in response to a change in driving mode of the vehicle, based on the battery power consumption in the driving mode of the vehicle.

4. The vehicle of claim 1, wherein the display is configured to display the interface in relation to DTE of a vehicle that increases when the at least one load stops operating.

5. The vehicle of claim 1, wherein the display is configured to display the interface in relation to an increase in DTE of the vehicle in response to a change in driving mode of the vehicle.

6. The vehicle of claim 1, wherein the DTE calculator is configured to calculate DTE of the vehicle based on an increase in DTE of the vehicle, determined when an operation of the at least one load is stopped.

7. The vehicle of claim 1, wherein the DTE calculator is configured to calculate DTE of the vehicle based on the changed driving mode when a change in driving mode has been made.

8. The vehicle of claim 1, wherein the DTE calculator is configured to calculate DTE of the vehicle at predetermined intervals.

9. The vehicle of claim 1, further comprising:
a communication unit configured to receive the information regarding a location of a recharging station from an external server.

10. The vehicle of claim 9, wherein the communication unit is configured to receive information from the external server regarding a predetermined route that the vehicle is able to travel at the battery charge level, when the recharging station is unavailable within the calculated DTE.

11. The vehicle of claim 1, further comprising:
a storage configured to store information regarding battery power consumption of the respective loads.

12. The vehicle of claim 11, wherein the storage is configured to store information regarding battery power consumption in each driving mode of the vehicle.

13. The vehicle of claim 11, wherein the storage is configured to store information regarding locations of a plurality of recharging stations.

14. The vehicle of claim 11, wherein the storage is configured to receive information regarding a predetermined route that the vehicle is able to travel at the battery charge level, when the recharging station is unavailable within the calculated DTE.

* * * * *